United States Patent Office 2,965,648
Patented Dec. 20, 1960

2,965,648

CERTAIN 1-ALKENYL BENZIMIDAZOLES

Christian Wiegand and Wolfgang Wirth, both % Farbenfabriken Bayer, A.G., Wuppertal-Elberfeld, Germany No Drawing. Filed Jan. 27, 1959, Ser. No. 789,266

Claims priority, application Germany Jan. 29, 1958

4 Claims. (Cl. 260—309.2)

This invention relates to novel chemical compounds useful in chemotherapy and more particularly it is concerned with certain novel benzimidazoles that are useful in altering blood pressure.

It is known that certain compounds such as epinephrine and the sympathomimetic amines are effective agents for increasing blood pressure. However, they have the disadvantage of being highly toxic materials and also of being substances toward which many persons exhibit idiosyncratic reactions. Furthermore, the use of these agents in cases of chronic hypotension has been found to result in the development of a tolerance and thus a need has been felt for other agents that might be employed in treatment of hypotension which might have the advantages of reduced toxicity, prolonged action, strong vasoconstrictor effects and reduced incidence of idiosyncratic reactions.

Various agents for reducing blood pressure have long been known, notably nitroglycerin, nicotinic alcohol derivatives, reserpine, priscoline and ganglionic blocking agents. Nitroglycerin has the disadvantage of rapidly producing an effect which is not sustained; the nicotinic alcohol derivatives and reserpine are disadvantageous for a variety of reasons, and the ganglionic blocking agents are much too dangerous for use except under carefully supervised conditions, such as in a hospital.

It is known that the administration of certain derivatives of imidazole produce marked effects on the blood pressure. Thus, 2-benzyl-3,4-dihydroimidazole produces strong vasodilator effects, whereas, in contrast, 2-(α-naphthylmethyl)-3,4-dihydroimidazole is a potent vasoconstrictor. It has been considered in the prior art that replacement of the alkyl or aralkyl groups in the 2-position by an aryl or heterocyclic radical would lead to compounds having practically no effect on the blood pressure.

It is now found unexpectedly that compounds with circulatory activity can be obtained if benzimidazoles and/or derivatives thereof substituted in the benzene nucleus, bear an unsaturated, aliphatic radical as a substituent in the 1-position and an aralkyl group as a substituent in the 2-position.

These compounds may be represented by the formula:

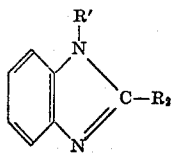

It will be understood that the benzene nucleus of the benzimidazole molecule may bear one or more substituentts, for example, halogens, alkyl, alkoxy, acyl sulfono, sulfonamido, nitro or amino groups. The substituent R' is an unsaturated short-chain aliphatic radical such as allyl, methallyl, crotyl, or haloallyl. The substituent $R_2$ is an aralkyl or a heteroaralkyl radical such as benzyl, o-chlorobenzyl, p-methoxybenzyl, and the radicals:

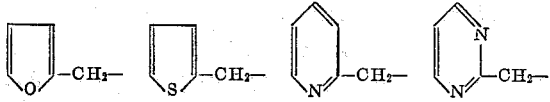

The radical $R_2$ may be substituted in the aliphatic moiety preferably by a hydroxyl group.

These novel products according to this invention are circulatory agents of unexpectedly prolonged action in causing a sustained rise or fall in blood pressure, depending on their molecular structure. Those compounds which are unsubstituted in the aliphatic portion of the radical $R_2$ generally cause a rise in the blood pressure, while hydroxyl substitution in this position brings about a lowering of the blood pressure.

The products in accordance with this invention may be prepared by previously known procedures applied to certain selected starting materials that heretofore have not been so utilized in these processes. Thus, the unsaturated aliphatic substituent group $R_1$ may be introduced into the benzimidazole molecule by reacting it with a reactive ester of an unsaturated alcohol, for example, an ester of an hydrohalic acid or an ester of an aliphatic or aromatic sulfonic acid in the presence of an acid acceptor such as an alkali-metal alcoholate. If the compound thus obtained subsequently is heated with an excess of a reactive ester of an unsaturated alcohol, an identical or different second unsaturated alkyl substituent group, depending on the nature of the intermediate product, may be introduced as radical $R_3$. Alternatively, o-phenylenediamines in which one or both aromatic amino groups are monosubstituted with an unsaturated aliphatic radical may be reacted with an aralkylcarboxylic acid, an arylcarboxylic acid, or a heteroaralkylcarboxylic acid, a heteroarylcarboxylic acid, or a reactive derivative thereof, followed by closure of the benzimidazole ring by conventional methods.

To facilitate a fuller and more complete understanding of the subject matter of this invention, certain specific examples herewith follow but it is clearly to be understood that these examples are provided by way of illustration merely and are not to be construed as imposing limitations upon the scope of the invention defined in the subjoined claims.

*Example I*

2-benzyl-benzimidazole is heated in the presence of an aliquot amount of sodium ethoxide with a small excess of crotyl chloride, the sodium chloride formed is removed by vacuum filtration, and the residue is evaporated, then dissolved and reprecipitated from dioxane to give 1-crotyl-2-benzyl-benzimidazole, melting at 205°–208° C. Administration of the product causes raising of the blood pressure.

*Example II*

2-benzyl-benzimidazole is heated with slightly more than 2 moles of allyl bromide in the presence of 1 mole of sodium ethoxide, then the mixture is worked-up as described in Example I and the product is reprecipitated from methanol to give 1,3-diallyl-2-benzyl-benzimidazolium chloride, melting at 277°–278° C. Administration of the product causes raising of the blood pressure.

*Example III*

1-(β-methylallyl)-2-benzyl-benzimidazole is prepared from β-methylallyl chloride and 2-benzyl-benzimidazole by heating these reactants together with sodium ethoxide by a procedure according to Example I. The hydrochloride of this compound is found to melt at 118°–120° C., following reprecipitation from acetone. This compound is heated for a short time under reflux with twice the stoichiometrically equivalent amount of allyl bromide and, after boiling for about 1 hour, the liquid solidifies. After grinding with ethyl acetate and redissolution in isopropanol, 1-(β-methylallyl)-2-benzyl-3-allyl benzimidazolium chloride is obtained melting at 265°–267° C. with decomposition. Administration of the product causes raising of the blood pressure.

*Example IV*

2-(α-hydroxybenzyl)-benzimidazole is heated for several hours with a small excess of crotyl chloride in the presence of the calculated amount of sodium ethoxide and the precipitated sodium chloride is filtered off under suction. 1-crotyl-2-(α-hydroxybenzyl)-benzimidazole crystallizes upon cooling and when it has been recrystallized from absolute alcohol, it melts at 162°–163° C. Administration of this product causes lowering of the blood pressure.

*Example V*

About 18.4 grams of 2-(2'-furyl)-benzimidazole is heated under reflux with 15 grams of allyl bromide in sodium ethoxide solution produced by reacting 2.3 grams of sodium and 100 cubic centimeters of absolute ethanol for 4 hours. The residue remaining after separation of precipitated sodium bromide is fractionated in vacuo. The resultant 1-allyl-2-(2'-furyl)-benzimidazole distills as a nearly colorless oil at a constant boiling point of about 180° C. under a pressure of 3 millimeters of mercury. It solidifies to a colorless crystal mass that melts at 65°–67° C. Upon administration, this product causes a rise in blood pressure.

*Example VI*

About 1 part by weight of 2-phenyl-1-benzyl-benzimidazole (melting point, 136°–137° C.) is heated, under reflux, with 2½ parts by weight of allyl bromide. Precipitation of 1-allyl-2-phenyl-3-benzyl-benzimidazolium bromide begins after a short time. Following evaporation of excess allyl bromide and redissolution in isopropyl alcohol, colorless crystals, melting at 184°–186° C., are obtained. Upon administration, this product causes a rise in blood pressure.

*Example VII*

Approximately equal parts by weight of 1-allyl-2-(2'-furyl)-benzimidazole (which may be prepared according to Example V) and of 2-thienylmethyl chloride are heated together to about 100° C. for several hours. The mass begins to solidify in about 1 hour. Following redissolution in a mixture of isopropyl alcohol and ethyl acetate, fine, colorless crystals of 1-allyl-2-(2'-furyl)-3-(2'-thienylmethyl)-benzimidazolium chloride are obtained which melt with decomposition at 191°–193° C. and which are readily soluble in water. Upon administration, this product causes a rise in blood pressure.

*Example VIII*

Aproximately equal parts by weight of 2-thienylmethyl chloride and 1-allyl-2-phenylbenzimidazole (melting point 95°–96° C.), which may be prepared according to the method of Example V using 2-phenylbenzimidazole as a starting material, are heated together on a water bath in the absence of moisture for about 1 hour, whereupon the entire mass crystallizes. Recrystallization from a mixture of a small amount of isopropyl alcohol and acetone yields 1-allyl-2-phenyl-3-(2'-thienylmethyl)-benzimidazolium chloride, melting at 215°–216° C. (with decomposition), which dissolves in water. Upon administration, this product causes a rise in blood pressure.

*Example IX*

Approximately equal parts by weight of 4-chlorobenzyl chloride and 1-allyl-2-phenylbenzimidazole (melting point 95°–96° C.), which may be prepared from 2-phenylbenzimidazole by the method according to Example V, are heated on a water bath. During 1 hour, the entire mass solidifies in crystalline form. After grinding with ethyl acetate and reprecipitation from chloroform by addition of carbon tetrachloride, fine, colorless needles of 1-allyl-2-phenyl-3-(4'-chlorobenzyl)-benzimidazolium chloride, melting at 223°–225° C. are obtained, which are very easily water-soluble. Upon administration, this product causes a rise in blood pressure.

Having thus described the subject matter of this invention, what it is desired to secure by Letters Patent of the United States is:

1. 1-crotyl-2-benzyl-benzimidazole.
2. 1-crotyl-2-(α-hydroxybenzyl)-benzimidazole.
3. 1-allyl-2-(2'-furyl)-benzimidazole.
4. A benzimidazole compound selected from the group consisting of 1-crotyl-2-benzyl-benzimidazole, 1-crotyl-2-(α-hydroxybenzyl)-benzimidazole and 1-allyl-2-(2'-furyl)-benzimidazole.

References Cited in the file of this patent

UNITED STATES PATENTS 2,623,879     Ringwald et al.     Dec. 30, 1952